(No Model.)

T. HARDING.
WAVE POWER TRANSMITTING APPARATUS.

No. 559,798. Patented May 12, 1896.

Witnesses,
J. H. Strouse
J. F. Ascheck

Inventor,
Thomas Harding
By Dewey & Co.
Attys

UNITED STATES PATENT OFFICE.

THOMAS HARDING, OF SAN JOSÉ, CALIFORNIA, ASSIGNOR OF ONE-HALF TO JAMES H. HENRY, OF SAME PLACE.

WAVE-POWER-TRANSMITTING APPARATUS.

SPECIFICATION forming part of Letters Patent No. 559,798, dated May 12, 1896.

Application filed March 2, 1896. Serial No. 581,479. (No model.)

*To all whom it may concern:*

Be it known that I, THOMAS HARDING, a citizen of the United States, residing at San José, county of Santa Clara, State of California, have invented an Improvement in Wave-Power-Transmitting Apparatus; and I hereby declare the following to be a full, clear, and exact description of the same.

My invention relates to a mechanism by which the rise and fall of waves is applied to correspondingly raise and depress a vertically-guided float; and it consists, essentially, of intermediate mechanism by which the movements thus effected are transmitted to mechanism which it is desired to drive thereby, and in a means essentially of maintaining the level of the transmitting apparatus approximately the same as that of the float as the tide rises and falls.

Figure 1:
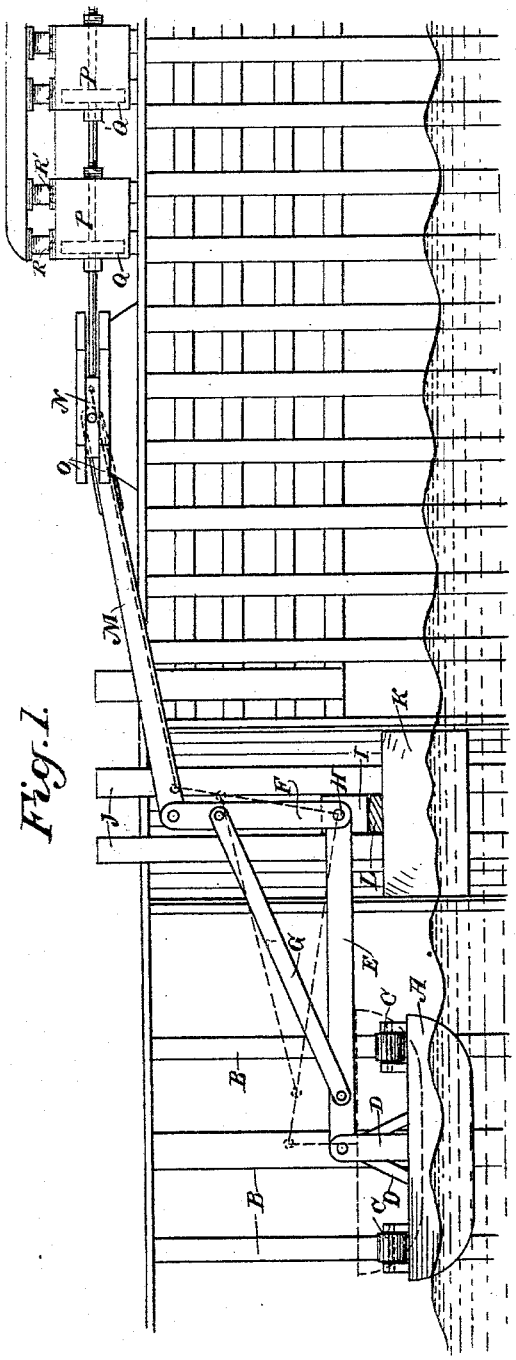
Figure 2:
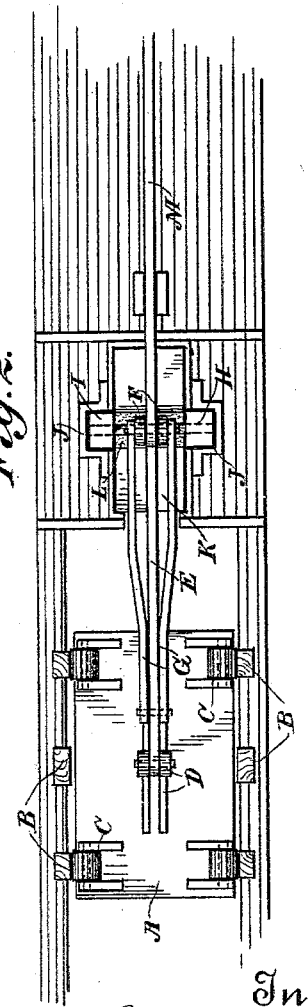

Referring to the accompanying drawings, Figure 1 is a side elevation. Fig. 2 is a plan view.

A is a float of any suitable or desired size and construction.

B B are vertical guide-timbers driven into the ground upon each side of the point where the float is to be located, and these timbers may also form part of a wharf or other structure which is arranged above and around the float and other parts of the apparatus, which must be made strong enough to resist the blows of the waves and the action of the float.

Upon each side of the float are journaled heavy rollers C, which are adapted to travel up and down against the faces of the guiding piles or timbers B, thus preventing the waves from throwing the float out of its position sidewise and causing it to simply rise and fall by the action of the waves. These rollers are of sufficient length so that any slight end movement of the float will not move them out of contact with the guiding piles or timbers.

Upon the float is fixed a stout framework of vertical timbers D, and between these timbers a connecting rod or pitman E is fulcrumed. This pitman extends to a second float K at some distance from the float A, and the opposite end of this pitman is pivoted between vertical arms F, which extend upwardly from the float, as shown. The upper part of these arms is connected with the pitman near the point of the supporting-timbers D by strong brace-timbers G, thus forming a triangular frame which is fulcrumed at the right angle by the shaft H, which passes through and unites the timbers F and the pitman C and also extends to each side into vertically-movable guide-blocks I, which are adapted to travel between vertical piles or timbers J. These guide-timbers are situated upon each side of an inclosed well in which the second or supplemental float K is inclosed. This well is surrounded by a sheathing which is sufficiently close to prevent any action of the waves from affecting the water within, but the openings into which are of sufficient size to allow the water to pass in and out freely enough to maintain the level of the water within this well approximately the same as that upon the outside. By this construction the inclosed float forms a movable fulcrum for the triangular lever, and it rises and falls automatically by the tidal movements only, so that it always maintains the same relative position to the wave-actuated float A.

L is a bolster upon which the sliding blocks G rest, this bolster being supported upon the float K, so that this portion of the apparatus rises and falls coincidently with the rise and fall of the float A, as produced by the action of the tide, but the inner float does not partake of the vertical oscillations caused by the waves or swell. By reason of this comparatively stationary relative position of the second float K the vertical movements of the exterior float A are transmitted through the connecting-pitman C and brace-rods G to the vertical arms or rods F of the triangular frame, thus causing these to be oscillated about the pivot pin or shaft which connects them with the guide-blocks at the bottom. From the upper ends of the oscillating arms F a long pitman or connecting-rod M extends to the cross-head N, traveling in guides O, suitably fixed and supported upon the wharf or other convenient structure adjacent to the float mechanism.

P P are cylinders which may be either adapted for air or water and serve, in the present case, to illustrate the mechanism to which the power generated by the movement of the float is applied. In the present case these cylinders are shown with interior pistons Q and inlet and outlet valves R R', so that the medium to be pumped will be operated upon in the usual manner of a pump. It will be seen by this construction that any rise or fall of the outer float A which is effected by the rise and fall of the tide will be participated in by the inclosed float K; but while the outer float receives all the vertical motion from the waves the inner float is protected from such motion, and the oscillation of the connecting rods and bars is thus effected about the fulcrum which is supported upon the float K, which is unaffected by the action of the waves, and this takes place at any stage of the tide, whether high or low. The other connecting rod or pitman which extends between the oscillating arms and the cross-head is made of such length that the rise and fall of the fulcrum-carrying float K will not essentially affect the operation of the pumps or mechanism connected with the cross-head.

The cylinders may be made a little longer than the proposed stroke, so that there will be room enough at either end to compensate for any slight changes in the position of the pistons within the cylinders.

Having thus described my invention, what I claim as new, and desire to secure by Letters Patent, is—

1. In a wave-power motor and transmitting apparatus, a vertically-guided float adapted to rise and fall by the action of the waves or swell, a second inclosed float protected from the action of the waves whereby the said float rises and falls with the movement of the tide only, a fulcrum-shaft supported upon said float, a connecting rod or pitman extending from said fulcrum-shaft to a shaft pivoted upon the wave-actuated float, vertical arms extending upwardly from the fulcrum-shaft of the inclosed float and brace-timbers extending from the upper ends of said arms and connecting with the pitman which unites the movable and inclosed floats, and a second pitman connecting the upper end of the vertical timbers with a cross-head and mechanism to be actuated thereby.

2. In a wave-motor, a vertically-guided float adapted to rise and fall by the action of the waves, a second inclosed float protected from the action of the waves but guided so as to rise and fall by the action of the tide only, a bolster mounted upon said float, guide-timbers upon each side of the float and vertically-sliding blocks movable between said timbers, a fulcrum-shaft extending from one of said blocks to the other above the float, a triangular frame having its angle of motion upon the fulcrum-shaft of the protected float whereby said frame is actuated by the rise and fall of the exterior float, and a connection between the upper angle of said triangular frame and a cross-head and mechanism to which the reciprocating motion is transmitted.

In witness whereof I have hereunto set my hand.

THOMAS HARDING.

Witnesses:
S. H. NOURSE,
JESSIE C. BRODIE.